United States Patent
Zhang

(10) Patent No.: US 10,253,712 B2
(45) Date of Patent: Apr. 9, 2019

(54) METHOD FOR OPERATING A PIEZO SERVO INJECTOR

(71) Applicant: Continental Automotive GmbH, Hannover (DE)

(72) Inventor: Hong Zhang, Tegernheim (DE)

(73) Assignee: CONTINENTAL AUTOMOTIVE GMBH, Hanover (DE)

(*) Notice: Subject to any disclaimer, the term of this patent is extended or adjusted under 35 U.S.C. 154(b) by 124 days.

(21) Appl. No.: 15/038,681

(22) PCT Filed: Sep. 30, 2014

(86) PCT No.: PCT/EP2014/070963
§ 371 (c)(1),
(2) Date: May 23, 2016

(87) PCT Pub. No.: WO2015/074793
PCT Pub. Date: May 28, 2015

(65) Prior Publication Data
US 2016/0298563 A1 Oct. 13, 2016

(30) Foreign Application Priority Data
Nov. 21, 2013 (DE) .................... 10 2013 223 764

(51) Int. Cl.
*F02M 51/00* (2006.01)
*F02D 41/20* (2006.01)
(Continued)

(52) U.S. Cl.
CPC ....... *F02D 41/2096* (2013.01); *F02D 41/401* (2013.01); *F02M 47/027* (2013.01);
(Continued)

(58) Field of Classification Search
CPC .............. H01L 41/042; F02M 21/0254; F02M 59/466; F02M 63/0066; F02M 63/0026;
(Continued)

(56) References Cited

U.S. PATENT DOCUMENTS 9,273,627 B2    3/2016   Brandt
2004/0149840 A1   8/2004   Remmels et al. ............ 239/584
(Continued)

FOREIGN PATENT DOCUMENTS

DE        10129375 A1    1/2003  ............. F02M 47/02
DE   102005037361 A1    3/2007  ............. F02D 41/20
(Continued)

OTHER PUBLICATIONS

German Office Action, Application No. 102013223764.2, 4 pages, dated Jul. 4, 2014.
(Continued)

*Primary Examiner* — John Kwon
(74) *Attorney, Agent, or Firm* — Slayden Grubert Beard PLLC

(57) ABSTRACT

The present disclosure provides a method for operating an injector of an internal combustion engine, the nozzle needle of said injector being operated by a piezo actuator by means of a servo valve. The method may include eliminating the idle travel of the piezo actuator by maintaining a permanent direct force connection between the piezo actuator and the servo valve, so that a change in force on the servo valve due to a change in pressure in the valve chamber when the servo valve is opened and closed and when the nozzle needle of the injector is closed is always transmitted to the piezo actuator as a change in force, detecting the resulting change in voltage and/or capacitance of the piezo actuator, and
(Continued)

ascertaining parameters with which the injection quantity which is output by the injector is regulated based on the result of the detection.

7 Claims, 1 Drawing Sheet

(51) Int. Cl.
*F02M 63/00* (2006.01)
*F02M 47/02* (2006.01)
*F02D 41/40* (2006.01)
*F02M 37/04* (2006.01)

(52) U.S. Cl.
CPC .... *F02M 63/0026* (2013.01); *F02M 63/0068* (2013.01); *F02D 2041/2051* (2013.01); *F02D 2041/2055* (2013.01); *F02D 2200/0616* (2013.01); *F02M 63/0043* (2013.01); *F02M 2547/006* (2013.01); *F02M 2547/008* (2013.01); *Y02T 10/44* (2013.01)

(58) Field of Classification Search
CPC ............. F02M 59/468; F02M 51/0603; F02D 41/2096
USPC .......... 123/406.47, 445, 472, 478, 490, 498, 123/616, 642
See application file for complete search history.

(56) References Cited

U.S. PATENT DOCUMENTS

| | | | | |
|---|---|---|---|---|
| 2013/0327301 | A1* | 12/2013 | Brandt | F02D 41/2096 123/478 |
| 2015/0013647 | A1* | 1/2015 | Zhang | F02D 41/2096 123/478 |
| 2015/0053181 | A1 | 2/2015 | Zhang et al. | 123/456 |
| 2015/0128910 | A1* | 5/2015 | Zhang | F02D 41/2096 123/478 |
| 2015/0152830 | A1 | 6/2015 | Denk et al. | 73/114.49 |

FOREIGN PATENT DOCUMENTS

| | | | | |
|---|---|---|---|---|
| DE | 102011003751 A1 | 8/2012 | ............. | F02D 41/20 |
| DE | 102012204252 B3 | 8/2013 | ............. | F02M 51/06 |
| DE | 102012205573 A1 | 10/2013 | ............. | F02D 41/20 |
| WO | 2001/63121 A1 | 8/2001 | ............. | F02D 41/20 |
| WO | 2013/139725 A1 | 9/2013 | ............. | F02D 41/20 |
| WO | 2015/074793 A1 | 5/2015 | ............. | F02D 41/20 |

OTHER PUBLICATIONS

International Search Report and Written Opinion, Application No. PCT/EP2014/070963, 23 pages, dated Dec. 3, 2014.

* cited by examiner

METHOD FOR OPERATING A PIEZO SERVO INJECTOR

CROSS-REFERENCE TO RELATED APPLICATIONS

This application is a U.S. National Stage Application of International Application No. PCT/EP2014/070963 filed Sep. 30, 2014, which designates the United States of America, and claims priority to DE Application No. 10 2013 223 764.2 filed Nov. 21, 2013, the contents of which are hereby incorporated by reference in their entirety.

TECHNICAL FIELD

The present disclosure relates to injectors of an internal combustion engine, and, in particular to injectors wherein the nozzle needle of said injector is operated by a piezo actuator by means of a servo valve.

BACKGROUND

In injectors operated by means of a servo valve, the nozzle needle of the injector is not directly connected to a piezo actuator with the expansion and contraction of said piezo actuator generating the opening and closing movement of the nozzle needle. Instead, a servo valve is located between the nozzle needle and the piezo actuator, the valve body of said servo valve connected to the piezo actuator and said servo valve lifted away from a valve seat due to the expansion of the actuator. This takes place against the force of a valve spring which presses the valve body against the valve seat. Lifting the valve body of the servo valve away from the valve seat results in fuel flow which leads to operation of the associated nozzle needle.

In injectors of this kind, both the profile of the servo valve movement and that of the nozzle needle movement must be precisely regulated in order to achieve injection of a precisely metered quantity of fuel. This is carried out, in some examples, such that the nozzle needle closing time is determined and regulated. To this end, a voltage must be applied to the piezo actuator after the servo valve is closed, and therefore the actuator continues to remain in force contact with the servo valve. However, this assumes that the idle travel of the piezo actuator is known. Therefore, the idle travel is adapted at the same time (by means of the pressure drop or by means of the change in frequency/amplitude of the piezo actuator during the activation). However, this known adaptation method is relatively slow, and the accuracy and robustness are dependent on operating conditions.

SUMMARY

The present disclosure provides a method of operation having a high degree of accuracy for quantities metered by the injector.

In some embodiments, a method may eliminate idle travel of the piezo actuator by maintaining a permanent direct force connection between the piezo actuator and the servo valve, so that a change in force on the servo valve due to a change in pressure in the valve chamber when the servo valve is opened and closed and when the nozzle needle of the injector is closed is always transmitted to the piezo actuator as a change in force, and that the resulting change in voltage and/or capacitance of the piezo actuator is detected, and parameters with which the injection quantity which is output by the injector is regulated are ascertained from the result of the detection.

In some embodiments, the method eliminates the idle travel of the piezo actuator and in this way achieving a direct force connection between the piezo actuator and the servo valve, as a result of which a feedback signal is always available when the nozzle needle is closed and, respectively, when the servo valve is opened/closed. Therefore, a force connection between the piezo actuator and the servo valve is always ensured, specifically even at an extremely low operating pressure. Owing to this force connection, the change in force which acts on the servo valve and is caused by a change in pressure in the valve chamber when the servo valve is opened or closed and when the nozzle needle is closed is transmitted to the piezo actuator, so that a change in the force which acts on the piezo actuator, which acts as a sensor in this case, and therefore a change in the voltage and/or capacitance of said piezo actuator are caused. Parameters with which the injection quantity which is output by the injector is regulated are then ascertained from this change in voltage and/or capacitance. The example methods are therefore distinguished by a high degree of accuracy, can be carried out quickly, and have a high level of robustness.

The opening or closing time of the servo valve and/or the closing time of the nozzle needle may be ascertained by ascertaining and evaluating the change in voltage, capacitance, and/or force across the piezo actuator. These times can be determined in a particularly accurate manner with the example methods. The corresponding ascertained ACTUAL times can be compared with the DESIRED times which are stored in the control device of the internal combustion engine and adjusted such that the injection quantity follows the desired quantity. In particular, the charging time and/or charging energy of the piezo actuator, the injection time, and/or the discharging time of the piezo actuator can be regulated in order to achieve this.

In order to adjust the force required for the permanent direct force connection, between the piezo actuator and the servo valve, the electrical voltage which is produced across the piezo actuator by said force can be used, wherein the force can be calculated from the electrical voltage. The adjustment operation can be terminated when the force has reached the desired value.

There are various methods for achieving the permanent sealing force connection between the piezo actuator and the servo valve. These methods can be carried out separately from one another, but can also be carried out in combination.

In some embodiments, the permanent direct force connection is produced by increasing the spring force for the servo valve. For example, the previously used spring force of 10 N is increased to 100-140 N.

In some embodiments, the permanent direct force connection is produced by adjusting the valve seat stiffness relative to the stiffness of the piezo actuator, e.g., to twice-four times the value of said stiffness. When the stiffness K_seat of the valve seat at the closing edge is adjusted or designed depending on the stiffness K_piezo of the piezo actuator, care is taken that K_seat is not too high in comparison to K_piezo, and therefore a force connection between the piezo actuator and the servo valve is still produced in the event of a variation in the actuator expansion in relation to the injector body due to piezo postpolarization/depolarization or due to a change in temperature. Secondly, K_seat should not be lower than K_piezo, so that there is sufficient valve lift in the open state in the event of piezo activation. The valve seat stiffness is therefore adjusted or designed such that it is two times to four times as high as the stiffness of the piezo actuator (for example from 75 N/micrometer today to 30 N/micrometer in comparison to 10 N/micrometer of the piezo actuator).

In some embodiments, the permanent direct force connection is adjusted during mounting of the injector without hydraulic force such that the force connection between the piezo actuator and the servo valve after clamping of the injector into the associated cylinder of the internal combustion engine taking into account the clamping force on the injector body is a fraction of, in particular approximately half, the spring force. In other words, the valve seat closing force should be approximately 70 N without rail pressure, for example at a spring force of 140 N. The force connection between the piezo actuator and the mushroom-type valve is preferably also 70 N here, and therefore in the event of a variation in the piezo expansion due to postpolarization and/or due to a change in temperature in relation to the injector body, there is still a force connection between the actuator and the servo valve or an adequate valve seat closing force.

In some embodiments, the permanent direct force connection is adjusted such that it is ensured even at an extremely low operating pressure, for example at 150 bar.

The piezo polarization may be stabilized by producing the permanent sealing force connection. The force connection between the actuator and the servo valve is therefore also used to stabilize the piezo polarization. In particular, when the actuator expands further when the piezo postpolarization increases, the force on the actuator owing to the force connection between the actuator and the servo valve is increased in this case, this leading to a reduction in the piezo postpolarization and therefore to a lower level of actuator expansion. The same also applies conversely in the case of piezo depolarization. Therefore, the piezo postpolarization or depolarization is very severely limited, this making a contribution to the length of the piezo actuator being held constant without activation at the respective operating point.

During operation of the engine, the actuator may not be short-circuited until the next injection operation after discharging of the piezo actuator, and therefore the change in voltage due to the change in force remains visible. The injector which is formed in this way can also be used to easily produce a leak by controlling the piezo voltage, without the nozzle needle being opened. This is used in order to reduce rail pressure to the desired value without PDV/PCV (pressure outlet valve), with a small injection quantity requirement, in particular in the event of the injection operation being switched off.

BRIEF DESCRIPTION OF THE DRAWINGS

The invention will be explained in detail below with reference to an exemplary embodiment in conjunction with the drawing, in which.

DETAILED DESCRIPTION

Figure 1:
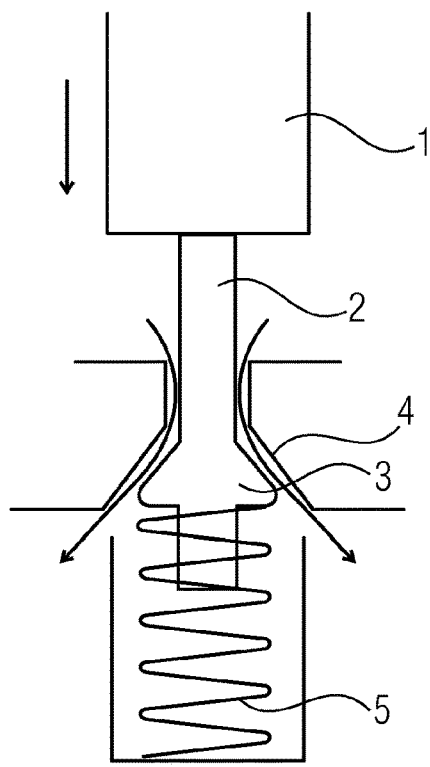
FIG. 1 shows a schematic sectional illustration of a portion of an injector comprising a piezo actuator and a servo valve.

FIG. 1 shows a portion of an injector of an internal combustion engine, the nozzle needle (not shown) of said injector being operated by a piezo actuator 1 by means of a servo valve 2. The servo valve 2 has a mushroom-shaped valve body 3 which interacts with a valve seat 4. A spring 5 presses the valve body 3 against the valve seat 4. When an electrical voltage is applied to the piezo actuator 1, said piezo actuator expands downward in the figure and in this way moves the valve body 3 of the servo valve 2 downward in the figure owing to the force of the spring 5, so that a flow channel is opened between the valve seat 4 and the valve body 3 as a result, fuel flowing through the said flow channel and it being possible for a movement of a nozzle needle, not shown, for initiating an injection process to be implemented as a result.

When the electrical voltage which is applied to the piezo actuator 1 is switched off, the piezo actuator contracts, so that the valve body 3 moves the spring 5 upward in the figure and the servo valve is closed again. In this case, the method according to the invention ensures that an idle travel which occurs between the piezo actuator 1 and the valve body 3 is eliminated and a permanent direct force connection between the piezo actuator 1 and the servo valve 2 is maintained. A change in force which acts on the servo valve 2 due to a change in pressure in the valve chamber when the servo valve 2 is opened and closed and when the nozzle needle is closed is therefore always transmitted to the piezo actuator 1 as a change in force and becomes apparent here as a change in voltage and/or capacitance of the piezo actuator 1 which acts as a sensor. This change can be detected, and parameters with which the injection quantity which is output by the injector is regulated can be ascertained from the result of the detection.

Figure 2:
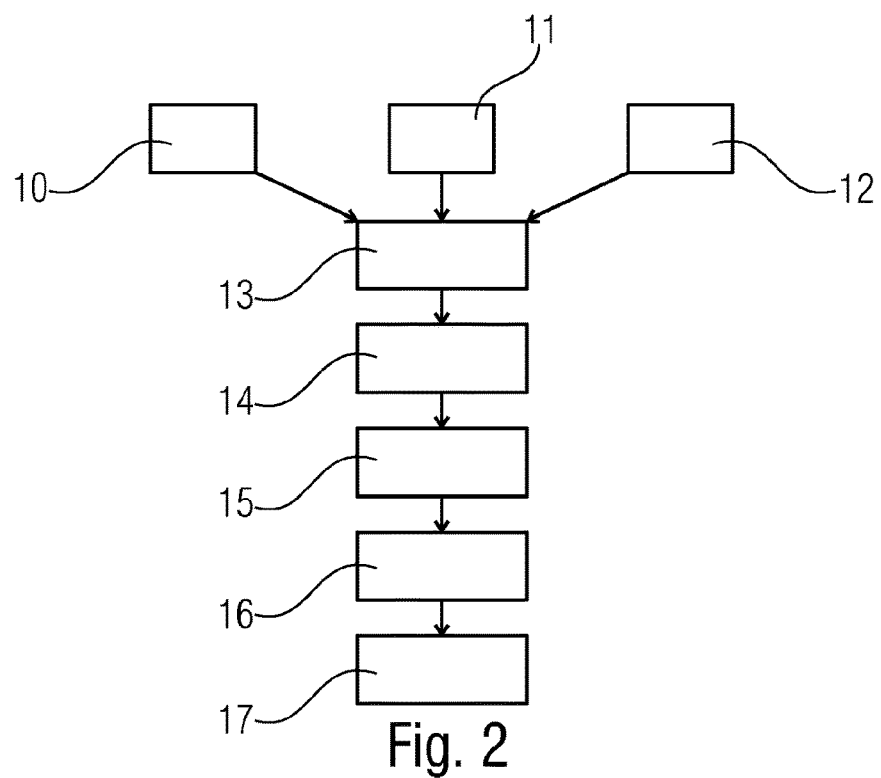
FIG. 2 shows a block diagram which shows a method for operating an injector.

FIG. 2 schematically shows the individual steps of the method according to the invention. In order to establish and to maintain a permanent direct force connection between the piezo actuator and the servo valve, the spring force for the servo valve 2 is increased in step 10, the valve seat stiffness relative to the stiffness of the piezo actuator 1 is adjusted in step 11, and/or the force connection between the piezo actuator 1 and the servo valve 2 after clamping of the injector into the associated cylinder of the internal combustion engine taking into account the clamping force on the injector body is adjusted in step 12 such that the force connection is approximately half the spring force. These measures are accordingly combined in step 13 in order to maintain a permanent direct force connection between the piezo actuator 1 and the servo valve 2.

The servo valve 2 is then opened and closed and the nozzle needle is closed in step 14. The resulting change in voltage and/or capacitance of the piezo actuator is detected in step 15. Corresponding parameters, for example the charging time, the charging energy, the injection time and the discharging time, are ascertained from the result of the detection in step 16, and said parameters are then correspondingly regulated in step 17, and therefore the injection quantity always follows the desired quantity.

What is claimed is:

1. A method for assembling and operating an injector of an internal combustion engine with a nozzle needle operated by a piezo actuator through a servo valve, the method comprising:

eliminating idle travel of the piezo actuator by maintaining a permanent direct force connection between the piezo actuator and the servo valve, so that a change in force on the servo valve due to a change in pressure in the valve chamber when the servo valve is opened and closed and when the nozzle needle of the injector is closed is always transmitted to the piezo actuator as a change in force, setting the spring force for the servo valve to produce the permanent direct force connection, setting the valve stiffness relative to the stiffness of the piezo actuator to produce the permanent direct force connection, in a range of twice to four times the value of the stiffness of the piezo actuator, detecting a change in voltage and/or capacitance of the piezo actuator resulting from the change in force transmitted to the piezo actuator during operation, and regulating an injection quantity output by the injector based on the detected change.

2. The method as claimed in claim 1, wherein the opening or closing time of the servo valve and/or the closing time of the nozzle needle are ascertained by ascertaining and evaluating the change in voltage, capacitance, and/or force across the piezo actuator.

3. The method as claimed in claim 1, further comprising regulating one or more of: the charging time or charging energy of the piezo actuator, the injection time, and the discharging time of the piezo actuator.

4. The method as claimed in claim 1, further comprising:
calculating a value of the force using the electrical voltage produced across the piezo actuator by the force required for the permanent direct force connection between the piezo actuator and the servo valve; and terminating the adjustment operation when the force has reached the desired value.

5. The method as claimed in claim 1, further comprising adjusting the permanent direct force connection during mounting of the injector without hydraulic force such that the force connection between the piezo actuator and the servo valve after clamping of the injector into the associated cylinder of the internal combustion engine taking into account the clamping force on the injector body is approximately half the spring force.

6. The method as claimed in claim 1, further comprising adjusting the permanent direct force connection such that it is ensured even at an extremely low operating pressure.

7. The method as claimed in claim 1, further comprising stabilizing the piezo polarization by producing the permanent direct force connection.

\* \* \* \* \*